(12) United States Patent
Savian et al.

(10) Patent No.: US 8,931,592 B2
(45) Date of Patent: Jan. 13, 2015

(54) AIRCRAFT INTERIOR PANEL WITH ACOUSTIC MATERIALS

(71) Applicant: C&D Zodiac, Inc., Huntington Beach, CA (US)

(72) Inventors: Scott Savian, Huntington Beach, CA (US); Eric Long, St-Lazare (CA); Jordan De Botton, Brossard (CA)

(73) Assignee: C&D Zodiac, Inc., Huntington Beach, CA (US)

( * ) Notice: Subject to any disclaimer, the term of this patent is extended or adjusted under 35 U.S.C. 154(b) by 0 days.

(21) Appl. No.: 13/936,546

(22) Filed: Jul. 8, 2013

(65) Prior Publication Data

US 2014/0008144 A1 Jan. 9, 2014

Related U.S. Application Data

(60) Provisional application No. 61/668,614, filed on Jul. 6, 2012.

(51) Int. Cl.
| | |
|---|---|
| *G10K 11/168* | (2006.01) |
| *B64C 1/40* | (2006.01) |
| *B64C 1/12* | (2006.01) |
| *G10K 11/16* | (2006.01) |
| *B64C 1/06* | (2006.01) |

(52) U.S. Cl.
CPC .. *B64C 1/40* (2013.01); *B64C 1/066* (2013.01)
USPC ............................. 181/290; 181/210; 244/119

(58) Field of Classification Search
CPC ............ B64C 1/40; B64C 1/00; B64C 1/066; B64C 1/12; E04B 1/82; E04B 1/84; E04B 1/74; E04B 1/8209; E04B 1/8409; G10K 11/168

USPC .......... 181/290, 293, 210; 244/1 N, 119, 120, 244/121, 123.12

See application file for complete search history.

(56) References Cited

U.S. PATENT DOCUMENTS

| | | | | |
|---|---|---|---|---|
| 2,209,825 | A | | 7/1940 | Mazer |
| 2,541,159 | A | * | 2/1951 | Geiger .......................... 181/208 |
| 3,302,358 | A | * | 2/1967 | Jackson ....................... 52/573.1 |
| 3,482,367 | A | * | 12/1969 | Curran ......................... 52/309.9 |
| 3,733,232 | A | * | 5/1973 | Payne ................................. 56/79 |
| 3,861,493 | A | * | 1/1975 | Payne ........................... 181/293 |
| 3,867,244 | A | * | 2/1975 | Adams .......................... 428/182 |
| 4,057,123 | A | * | 11/1977 | Erickson ....................... 181/286 |

(Continued)

OTHER PUBLICATIONS

International Search Report and Written Opinion issued on Dec. 12, 2013 in related PCT/US2013/049597.

*Primary Examiner* — Edgardo San Martin

(74) *Attorney, Agent, or Firm* — Brennan C. Swain, Esq.; Jeffer Mangels Butler & Mitchell LLP

(57) ABSTRACT

A panel assembly that includes a first panel having an inner surface and an outer surface, and a second panel having an inner surface and an outer surface. The second panel includes a plurality of rib members formed therein that extend inwardly. The rib members include an inner surface and an outer surface. A plurality of panel portions are defined between the plurality of rib members. The panel portions include an inner surface and an outer surface. The inner surface of the rib members are secured to the inner surface of the first panel, and the inner surface of the panel portions is spaced apart from the inner surface of the first panel to define at least first and second cavities.

11 Claims, 6 Drawing Sheets

(56) References Cited

U.S. PATENT DOCUMENTS

| | | | |
|---|---|---|---|
| 4,346,544 A * | 8/1982 | Larssen | 52/407.4 |
| 4,425,981 A * | 1/1984 | Kiesewetter et al. | 181/286 |
| 4,531,609 A * | 7/1985 | Wolf et al. | 181/290 |
| 4,555,433 A * | 11/1985 | Jablonka et al. | 428/166 |
| 4,600,078 A * | 7/1986 | Wirt | 181/286 |
| 4,605,088 A * | 8/1986 | Sickels | 181/30 |
| 4,755,416 A * | 7/1988 | Schneider et al. | 428/167 |
| 4,804,571 A * | 2/1989 | Jouffreau | 428/77 |
| 4,919,366 A * | 4/1990 | Cormier | 244/159.1 |
| 5,165,627 A * | 11/1992 | Amano et al. | 244/119 |
| 5,399,406 A * | 3/1995 | Matsuo et al. | 428/57 |
| 5,509,247 A * | 4/1996 | Fortez et al. | 52/630 |
| 5,596,847 A * | 1/1997 | Stephenson | 52/198 |
| 5,622,733 A * | 4/1997 | Asher | 425/504 |
| 5,884,446 A * | 3/1999 | Hageman | 52/408 |
| 6,108,993 A * | 8/2000 | Hageman | 52/408 |
| 6,260,660 B1 * | 7/2001 | Yoerkie et al. | 181/290 |
| 6,276,044 B1 * | 8/2001 | Ragland et al. | 29/521 |
| 7,074,474 B2 * | 7/2006 | Toi et al. | 428/102 |
| 7,134,629 B2 * | 11/2006 | Johnson et al. | 244/119 |
| 7,716,835 B2 * | 5/2010 | Johnson et al. | 29/897.2 |
| 7,818,922 B2 | 10/2010 | Ellis | |
| 8,028,483 B2 * | 10/2011 | Carolan | 52/404.1 |
| 2005/0005544 A1 | 1/2005 | Borowiecki | |
| 2006/0131104 A1 | 6/2006 | Yamaguchi | |

* cited by examiner

AIRCRAFT INTERIOR PANEL WITH ACOUSTIC MATERIALS

CROSS REFERENCE TO RELATED APPLICATIONS

This application claims the benefit of U.S. Provisional Application No. 61/668,614 filed Jul. 6, 2012, which is incorporated herein by reference in its entirety.

FIELD OF THE INVENTION

The present invention relates to an aircraft interior panel, and, more particularly to an aircraft interior panel with noise attenuation properties.

BACKGROUND OF THE INVENTION

Commercial aircraft, such as the Airbus A320 or Boeing 737 are typically constructed from modular components, the size, weight and construction of which are dictated by many considerations, including fuselage dimensions, aesthetic and safety considerations. Many of these requirements are imposed by law or regulation. Aircraft components, such as overhead stowage compartments, seats, lavatories, galleys, lighting systems, etc. are all required to function within strictly confined spaces.

Manufacturers of aircraft are constantly refining interior aircraft designs to achieve more comfort and utility for passengers and crew within carrier-imposed restraints on cost, weight, maintenance down-time, and safety. The current interior wall panels used in the aircraft interior industry are based on a build up that has been around for decades. The composite sandwich panel is a staple in the aircraft interiors industry today. Many panel and acoustics providers are looking for new ways to evolve the composite sandwich panel by incorporating different treatments to the skin of the panel.

SUMMARY OF THE PREFERRED EMBODIMENTS

In accordance with a first aspect of the present invention there is provided a panel assembly that includes a first panel having an inner surface and an outer surface, and a second panel having an inner surface and an outer surface. The second panel includes a plurality of rib members formed therein that extend inwardly. The rib members include an inner surface and an outer surface. A plurality of panel portions are defined between the plurality of rib members. The panel portions include an inner surface and an outer surface. The inner surface of the rib members are secured to the inner surface of the first panel, and the inner surface of the panel portions is spaced apart from the inner surface of the first panel to define at least first and second cavities. In a preferred embodiment, the panel assembly includes a first acoustic treatment member positioned in the first cavity. The first acoustic treatment member is adhered to at least one of the inner surface of the first panel or the inner surface of the second panel. Preferably, a space is defined between the first acoustic treatment member and one of the inner surface of the first panel or the inner surface of the second panel. In a preferred embodiment, the first acoustic treatment member is comprised of at least first and second layers. Preferably, the first acoustic treatment member is adhered to the inner surface of the second panel, and the second panel includes a plurality of raised portions defined therein. In a preferred embodiment, the panel assembly includes a second acoustic treatment member. The first acoustic treatment member is adhered to the inner surface of the first panel and the second acoustic treatment member is adhered to the inner surface of the outer panel, and a space is defined between the first and second acoustic treatment members. In an embodiment, the second cavity defines a ducting space and the does not include an acoustic treatment member therein. In a preferred embodiment, the panel assembly includes an outer acoustic treatment member adhered to at least a portion of the outer surface of the second panel and a decorative panel adhered to the outer surface of the first panel member.

In accordance with a first aspect of the present invention there is provided an aircraft fuselage wall that includes a plurality of frame members and a panel assembly that includes a first panel having an inner surface and an outer surface, and a second panel having an inner surface and an outer surface. The second panel includes a plurality of rib members formed therein that extend inwardly and each define an outer rib cavity. The rib members include an inner surface and an outer surface. A plurality of panel portions are defined between the plurality of rib members. The panel portions include an inner surface and an outer surface. The inner surface of the rib members are secured to the inner surface of the first panel, and the inner surfaces of the panel portions are spaced apart from the inner surface of the first panel to define at least first and second cavities. At least some of the frame members are received in at least some of the outer rib cavities.

In an exemplary embodiment, the present invention includes no fill and fare, e.g., bondo, (however, in another embodiment, fill and fare can be implemented). In use, the present invention can provide an approximately 8-10% reduction in noise transmission compared to the prior art (however, this range is only exemplary and is not a limitation). Furthermore, the production process is energy efficient and preferably uses reusable and recyclable material. The panels provide zero to little water absorption, a favorable surface finish, approximately sixty second press time and overwrap decor with flam compliance. The panels can be made of materials such as Ultem and glass fiber composite, thermoformed material in a preferred embodiment. The panels can be crushed into a large variety of shapes with integrated acoustic treatments.

In a preferred embodiment, the panel assembly includes two (inner and outer) panels bonded together. The inner panel has a smooth cross section and the outer panel has a corrugated cross section. The outer panel provides stiffness to the panel assembly with incorporated standoff ribs. It will be appreciated by those of skill in the art that the inner and outer panels can also be made of other materials such as phenolic (e.g., crush core honeycomb panels or layup laminates). By spacing the two panels apart, the present invention provides a strong structure that provides rigidity to the panel assembly. The double panel/wall construction, and the space/cavity therebetween, provides an acoustic barrier.

In a preferred embodiment, the cavity between the inner and outer panel includes acoustic treatments, such as one or more layers of the same or different materials that provide an acoustic barrier. In a preferred embodiment, the cavity includes a multiple layer treatment. The layers of the treatment are comprised of materials that have different acoustic impedances. Therefore, when noise is propagating therethrough, at each interface between different materials/layers, there is a reduction in the efficiency of sound propagation producing a reduction in sound level. In an embodiment, another acoustic treatment can be positioned on the outside of the corrugated outer panel for added acoustic performance.

As shown in the figures, in an exemplary embodiment, the present invention combines a decorative panel and a first structural panel with the second structural panel to define a distance therebetween and the ability to attach acoustic materials to the various structural surfaces. The ability to provide multiple material densities (including air pockets) in layers (key in noise attenuation) is increased with the assembly taught herein.

The invention, together with additional features and advantages thereof, may be best understood by reference to the following description.

DETAILED DESCRIPTION OF THE PREFERRED EMBODIMENTS

Figure 1:
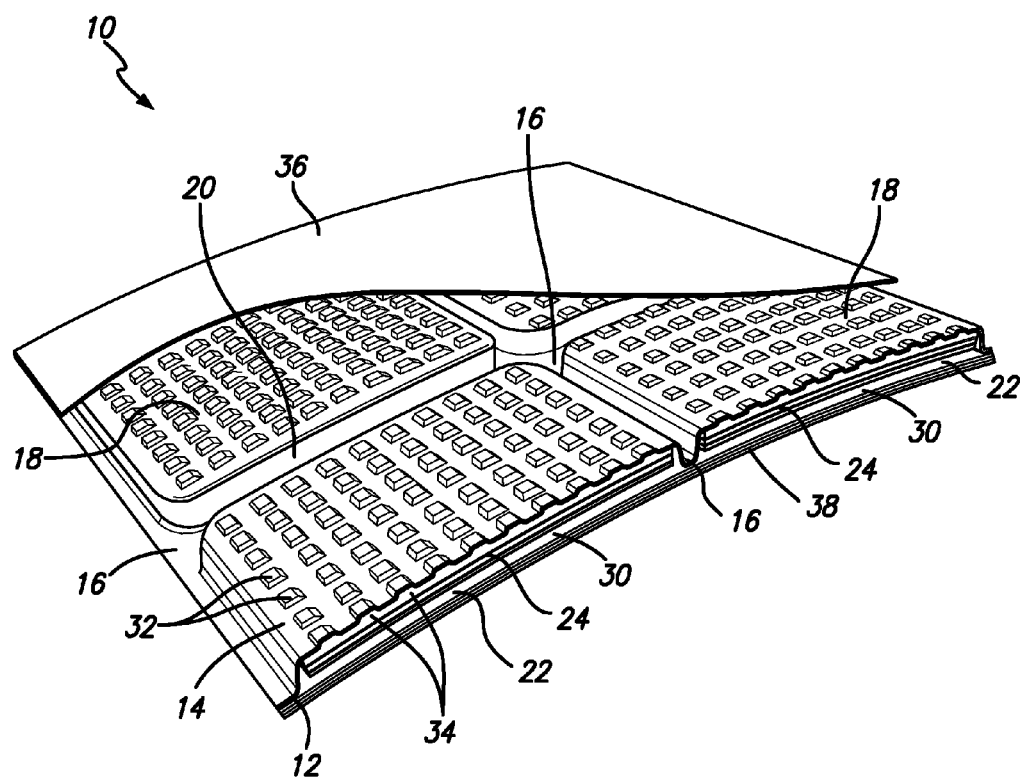
FIG. 1 is a perspective view of a panel assembly in accordance with an embodiment of the present invention.
Figure 2:
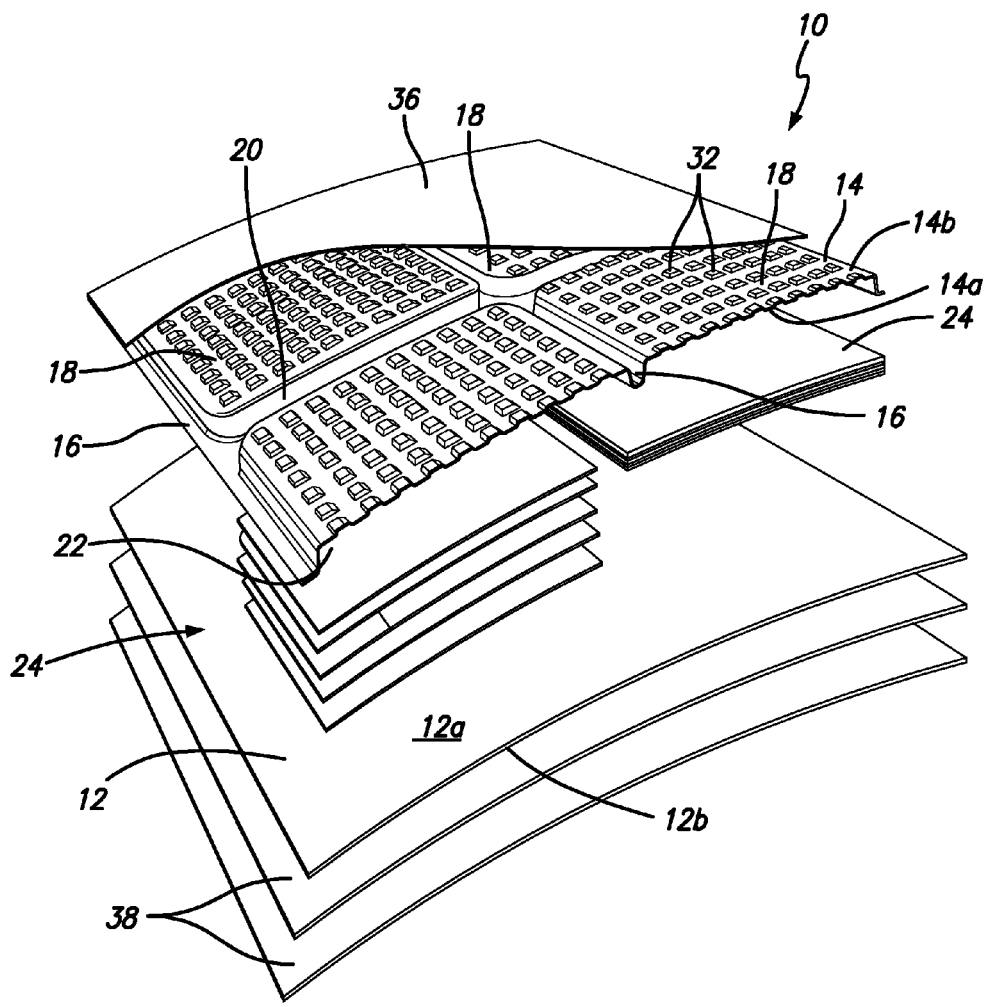
FIG. 2 is an exploded perspective view of the panel assembly of FIG. 1.

The following description and drawings are illustrative and are not to be construed as limiting. Numerous specific details are described to provide a thorough understanding of the disclosure. However, in certain instances, well-known or conventional details are not described in order to avoid obscuring the description. References to one or an other embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. Appearances of the phrase "in one embodiment" in various places in the specification do not necessarily refer to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein. Nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," and "below" used herein are merely for ease of description and refer to the orientation of the components as shown in the figures. It should be understood that any orientation of the components described herein is within the scope of the present invention.

Referring now to the drawings, wherein the showings are for purposes of illustrating the present invention and not for purposes of limiting the same, FIGS. 1-6 show a panel assembly 10 for use in the wall 100 of a vehicle, such as an aircraft. In particular, the invention is contemplated for use on commercial passenger aircraft. However, this is not a limitation on the present invention and the panel assembly can be used elsewhere.

As shown in FIGS. 1-4, in a preferred embodiment, the panel assembly 10 includes a first panel 12 having an inner surface 12a and an outer surface 12b and a second panel 14 having an inner surface 14a and an outer surface 14b. When positioned in an aircraft, the first panel is the inner panel and the second panel is the outer panel. In a preferred embodiment, the second panel 14 is corrugated to form a plurality of rib members 16 and a plurality of panel portions 18. It will be appreciated that the inner and outer surfaces of the rib members and panel portions are the same as the inner and outer surfaces of the outer panel. However, for ease of description, the rib members 16 include inner surface 16a and outer surface 16b and the panel portions 18 include inner surface 18a and outer surface 18b.

Preferably, the second panel 14 includes a plurality of the rib members 16 formed therein that extend inwardly and that each define an outer rib cavity 20. In a preferred embodiment, the inner surface 16a of the rib members 16 are secured to the inner surface 12a of the first panel 12. This can be accomplished by any method known in the art, such as gluing, adhering, affixing, securing with fasteners, welding, etc. Furthermore, an acoustic treatment member or layer or the like can be positioned between the inner surface 16a of the rib members 16 and the inner surface 12a of the first panel 12. This is within the scope of "securing" within the present invention.

Figure 3:
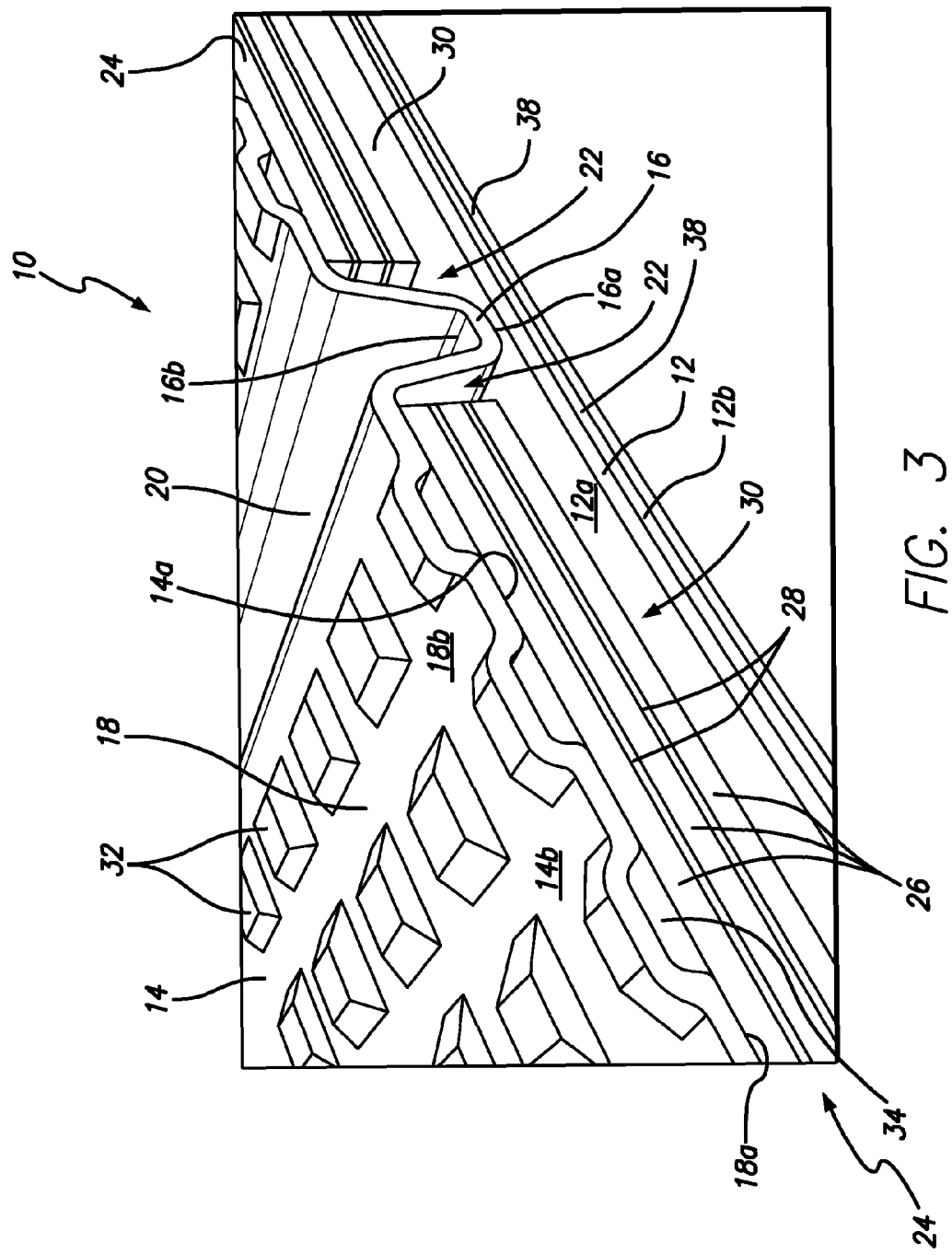
FIG. 3 is a perspective view of an end of the panel assembly of FIG. 1.
Figure 4:
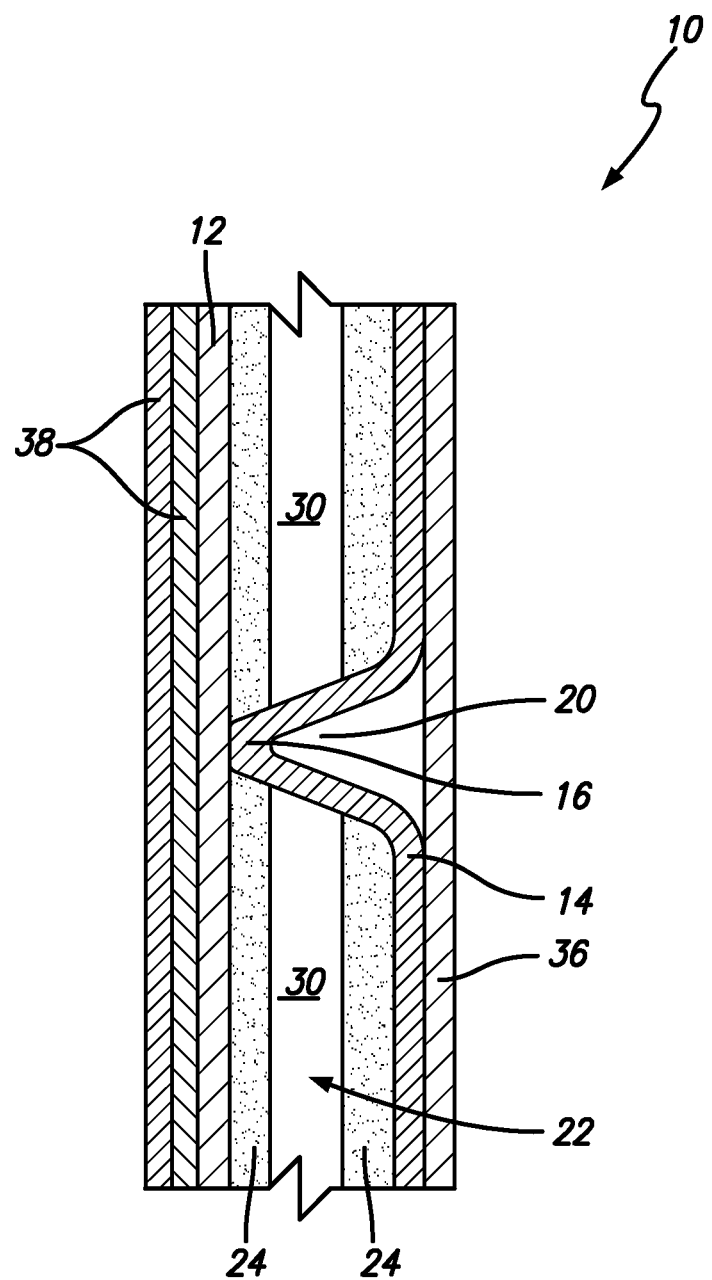
FIG. 4 is a cross-sectional view of the panel assembly of FIG. 1.

As shown in FIG. 3, the inner surface of each panel portion 18a is spaced apart from the inner surface of the first panel 12a to define a plurality of cavities 22. In a preferred embodiment, at least a portion of the cavities 22 include acoustic treatment members 24 are positioned therein. The acoustic treatment members 24 are comprised of materials that are known to reduce noise travel therethrough. For example, the acoustic treatment members 24 can be comprised of any combination (in various layers) of the following materials types: Nomex felt or another acoustic felt, such as MC8-4596 from TexTech Industries; skin damping material, such as ADC-006 from EAR Specialty Composites, K1050 or FRO54OU from Damping Technologies, Inc.; rubber or vinyl acoustic sheets, such as Isodamp C-1002 from EAR Specialty Composites. None of these materials are limiting and the acoustic treatment members can be made of any material with acoustic damping properties known in the art.

In a preferred embodiment, the acoustic treatment members 24 include a number of layers of different materials. For example, as shown best in FIGS. 2-3, the acoustic treatment members 24 include layers 26 and 28 of different materials having different thicknesses.

The acoustic treatment members 24 can be adhered to one or both of the inner surfaces of the first panel 12 or the second panel 14. In other words, the acoustic treatment members 24 can fill the entire cavity 22 or space between the panel portion 18 and the first panel 12 or, a space 30 can be defined between the acoustic treatment member 24 and the first panel 12 or the second panel 14. As shown in FIG. 3, in a preferred embodiment, the second panel 14 includes a plurality of raised portions 32 defined therein. The raised portions 32 provide air pockets 34 that further reduce noise propagation.

In a preferred embodiment, the panel assembly 10 also includes an outer acoustic treatment member 36 that is adhered to the outer surface 14b of the second panel 14. The panel assembly 10 can also include a decorative panel 38 or other layers adhered to or positioned adjacent the outer surface 12b of the first panel member 12.

Figure 5:
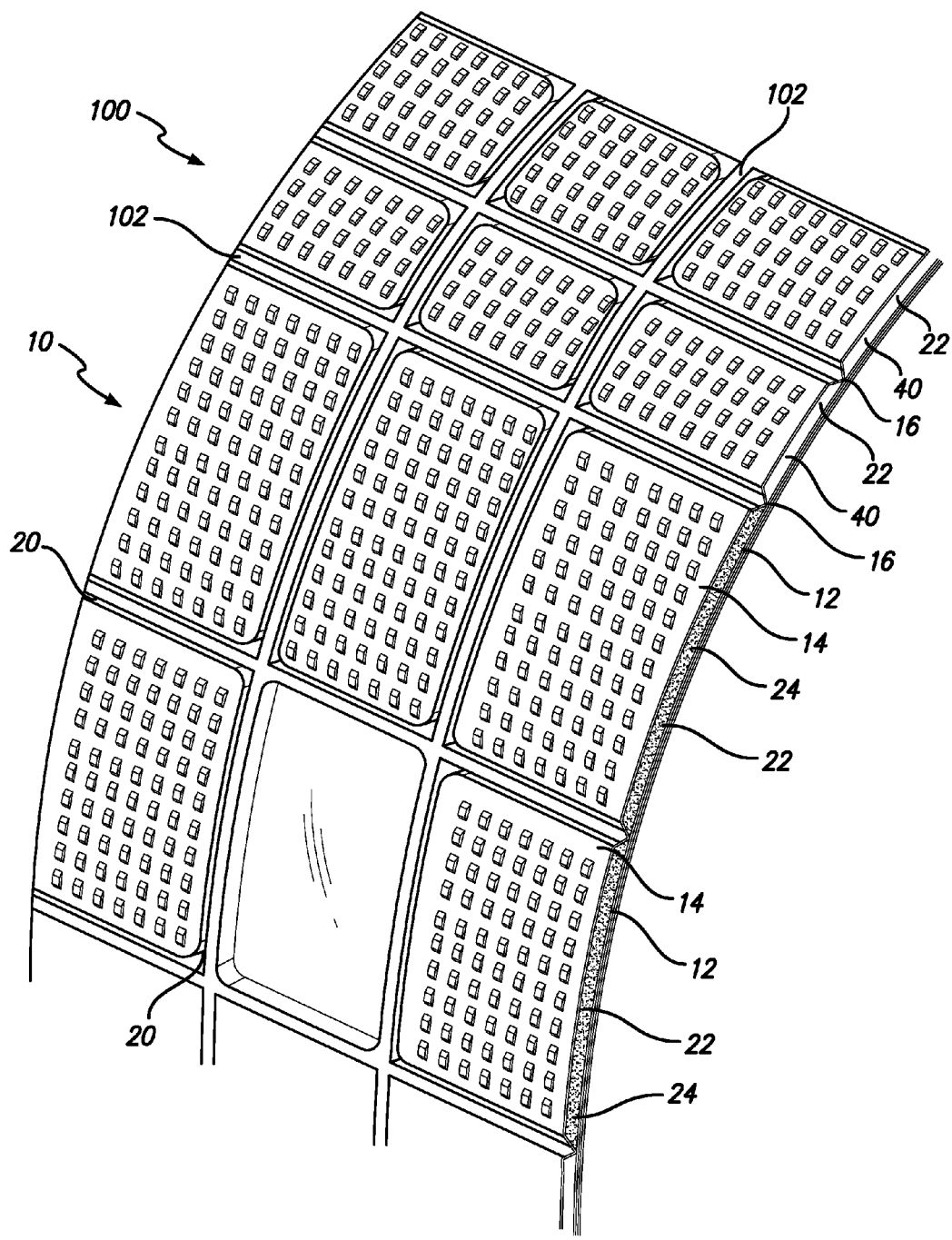
FIG. 5 is a perspective view of the panel assembly of FIG. 1 incorporated into the wall of an aircraft.
Figure 6:
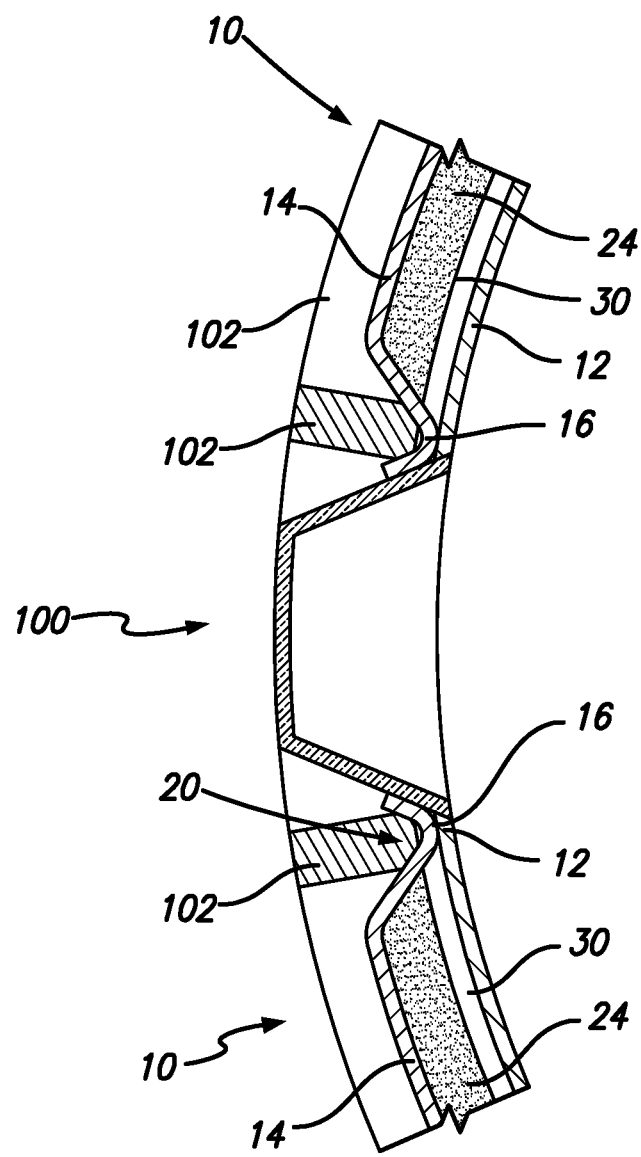
FIG. 6 is a cross-sectional view taken along line 6-6 of FIG. 5.

FIGS. 5-6 show a plurality of panel assemblies 10 installed within the wall 100 of an aircraft fuselage. The wall 100 includes frame members 102. As shown in FIG. 5, in a preferred embodiment, some of the frame members 102 are received in some of the outer rib cavities 22. FIG. 6 shows how the rib members 16 abut the window of an aircraft.

As shown in FIG. 5, in an embodiment of the invention, some of the cavities 22 can define ducting space 40 and can be used to route systems, wire harnesses, air ducting, etc. The ducting space 40 can be coincident with space 30 in cavities 22 that include acoustic treatment members 24 therein or the ducting space 40 can be defined in cavities 22 that do not include any acoustic treatment members 24 therein, as shown in FIG. 5. The ducting space 40 can be used to reduce the use of traditional ducting within the aircraft.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed, at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. An aircraft fuselage wall comprising:
at least first and second frame members, wherein the first and second frame members extend approximately parallel to one another,
a panel assembly that includes
a first panel having an inner surface and an outer surface, and a second panel having an inner surface and an outer surface, wherein the second panel includes at least first and second rib members formed therein that extend inwardly and each define an outer rib cavity, wherein the first and second rib members each include an inner surface and an outer surface, wherein at least a first panel portion is defined between the first and second rib members, wherein the first panel portion includes an inner surface and an outer surface, wherein the inner surfaces of the first and second rib members are secured to the inner surface of the first panel, and wherein the inner surface of the first panel portion is spaced apart from the inner surface of the first panel to define at least a first cavity, wherein the first and second frame members are received in and extend longitudinally along the first and second outer rib cavities, respectively.

2. The aircraft fuselage wall of claim 1 further comprising a first acoustic treatment member positioned in the first cavity.

3. The aircraft fuselage wall of claim 2 wherein the first acoustic treatment member is adhered to at least one of the inner surface of the first panel or the inner surface of the second panel.

4. The aircraft fuselage wall of claim 3 further comprising a second acoustic treatment member, wherein the first acoustic treatment member is adhered to the inner surface of the first panel and the second acoustic treatment member is adhered to the inner surface of the second panel, and wherein a space is defined between the first and second acoustic treatment members.

5. The aircraft fuselage wall of claim 1 further comprising an outer acoustic treatment member adhered to at least a portion of the outer surface of at least two of the panel members, and wherein an outer rib cavity is defined between the outer acoustic treatment member and the outer surface of the rib member.

6. The aircraft fuselage wall of claim 5 further comprising a decorative panel adhered to the outer surface of the first panel member.

7. The aircraft fuselage wall of claim 3 wherein a space is defined between the first acoustic treatment member and one of the inner surface of the first panel or the inner surface of the second panel.

8. The aircraft fuselage wall of claim 7 wherein the first acoustic treatment member is comprised of at least first and second layers.

9. The aircraft fuselage wall of claim 3 wherein the first acoustic treatment member is adhered to the inner surface of the second panel, and wherein the second panel includes a plurality of raised portions defined therein.

10. The aircraft fuselage wall of claim 2 wherein the second cavity defines a ducting space.

11. The panel assembly of claim 10 wherein the second cavity does not include an acoustic treatment member therein.

* * * * *